United States Patent
Bellamkonda

(10) Patent No.: US 11,301,468 B2
(45) Date of Patent: Apr. 12, 2022

(54) EFFICIENT EXECUTION OF A SEQUENCE OF SQL OPERATIONS USING RUNTIME PARTITION INJECTION AND ITERATIVE EXECUTION

(71) Applicant: Oracle International Corporation, Redwood Shores, CA (US)

(72) Inventor: Srikanth Bellamkonda, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 166 days.

(21) Appl. No.: 16/571,006

(22) Filed: Sep. 13, 2019

(65) Prior Publication Data

US 2021/0081419 A1 Mar. 18, 2021

(51) Int. Cl.
*G06F 16/00* (2019.01)
*G06F 16/2453* (2019.01)

(52) U.S. Cl.
CPC .. *G06F 16/24542* (2019.01); *G06F 16/24537* (2019.01)

(58) Field of Classification Search
None
See application file for complete search history.

(56) References Cited

U.S. PATENT DOCUMENTS

| | | | | |
|---|---|---|---|---|
| 10,268,726 | B1 * | 4/2019 | Schiesser | H04L 67/1097 |
| 2012/0047158 | A1 * | 2/2012 | Lee | G06F 16/24545 707/759 |
| 2014/0156636 | A1 * | 6/2014 | Bellamkonda | G06F 16/24556 707/718 |
| 2014/0214799 | A1 * | 7/2014 | Li | G06F 16/24532 707/718 |
| 2015/0356162 | A1 * | 12/2015 | Zhang | G06F 16/27 707/603 |
| 2015/0379077 | A1 * | 12/2015 | Grosse | G06F 16/24542 707/718 |
| 2018/0173757 | A1 * | 6/2018 | Chen | G06F 16/24542 |

* cited by examiner

*Primary Examiner* — Augustine K. Obisesan
(74) *Attorney, Agent, or Firm* — Hickman Becker Bingham Ledesma LLP

(57) ABSTRACT

Execution plans generated for multiple analytic queries incorporate two new kinds of plan operators, a partition creator and partition iterator. The partition creator and partition iterator operate as a pair. A partition creator operator creates partitions of rows and a partitioning descriptor describing the partitions created. A partition iterator iterates through the partitions based on the partitioning descriptor. For each partition, multiple analytic operators are executed serially, one after the other, on the same rows in the partition. According to an embodiment, partitioning is based on a common grouping or subgrouping of the multiple analytic functions or operators. Columns in the grouping or subgrouping may be ignored when executing each of the multiple analytic operators. Forming execution plans that include partition creator and partition iterator in this way is referred to herein as partitioning injection.

20 Claims, 8 Drawing Sheets

| prod_id | channel_id | cust_id | amount_sold | quantity_sold | rank_q | rank_a |
|---|---|---|---|---|---|---|
| P1 | Ch1 | Cust1 | 800.00 | 10 | 1 | |
| P1 | Ch1 | Cust2 | 430.00 | 10 | 1 | |
| P1 | Ch1 | Cust3 | 16.00 | 15 | 3 | |
| P1 | Ch2 | Cust1 | 1000.00 | 10 | 1 | |
| P1 | Ch2 | Cust2 | 2000.00 | 20 | 2 | |
| P2 | Ch1 | Cust1 | 500.00 | 15 | 1 | |
| P2 | Ch1 | Cust2 | 200.00 | 20 | 2 | |
| P2 | Ch1 | Cust3 | 75.00 | 20 | 2 | | partition P1C1
partition P1C2
partition P2C1 scanned rows 201
"sorted on"

EFFICIENT EXECUTION OF A SEQUENCE OF SQL OPERATIONS USING RUNTIME PARTITION INJECTION AND ITERATIVE EXECUTION

FIELD OF THE INVENTION

The present invention relates to generation and execution of queries that perform analytic functions against data within a database management system ("DBMS").

BACKGROUND

Analytic database applications may issue database queries that perform multiple analytic operations on multiple measures or multiple analytic operations on the same measure but on a different partitioning of dimensions. Execution plans generated for such queries may execute each analytic operation separately and serially on a single-row flow of the same rows, where the same set of rows is the input and output of one analytic operation, and then is the input to another analytic operation. Because each analytic operation is performed serially, one after the other, certain intermediate operations such as intermediate sorting are repeated for each analytic operation.

Query Q1 below is an example of a query that repeats the same intermediate sorting on the same partitioning of dimensions but different measure columns.

| Q1 |
|---|
| select<br>    prod_id, channel_id, cust_id<br>    rank( ) over (partition by prod_id, channel_id order by amount_sold)<br>    rank( ) over (partition by prod_id, channel_id order by quantity_sold)<br>from sales; |

Q1 specifies analytic functions that are window ranking functions, as follows:

(a) rank( ) over (partition by prod_id, channel_id order by (amount_sold)

(b) rank( ) over (partition by prod_id, channel_id order by (quantity_sold)

Both window ranking functions rank within partitions defined the same partitioning keys (prod_id, channel_id), which are specified by the PARTITION BY clause. Thus, both analytic functions compute a ranking within the same partitions of rows. However, both use different ranking keys, the first ranks based on the measure column amount_sold while the second ranks quantity_sold. Examples of analytic functions are described in Oracle® Database, SQL Language Reference, 12c Release 1 (12.1, E41329-25), July 2017, the entire contents of which are incorporated herein by reference.

Despite sharing the same partitions, the analytic functions are computed independently, as illustrated by execution plan 101 in FIG. 1. Referring to FIG. 1, it depicts an execution plan 101 for executing query Q1.

An "execution plan" or "query execution plan", as the term is used herein, refers to a set of execution plan operations specified by a database system to execute a database statement such as a query. An execution plan operation is an operation that may be assigned to a database process for execution. Execution plan operations include, for example, an aggregation, a sort, a table scan, an index scan, hash-join, sort-merge join, nested-loop join, and filter. An execution plan may be represented by a tree (or a graph) of interlinked nodes, referred to herein as "plan operators" or "operators", each of which corresponds to a separate operation of an execution plan operation. The hierarchy of the tree represents the order in which the execution plan operations are performed and/or how data flows between each of the execution plan operations.

Execution plan 101 is depicted with four plan operators. Table scan operator 120 scans rows from table sales. The output rows scanned are supplied by Table Scan operator 120 as input rows to Window Rank QuantitySold 115.

Window Rank QuantitySold 115 implements the window ranking function rank( ) over (partition by prod_id, channel_id order by (quantity_sold) specified in Q1. As shall be described in greater detail, Window Rank QuantitySold 115 ranks, within each partition defined by partition keys prod_id and channel_id, rows according to ranking column quantity_sold. The rank for each row may be inserted in a column of each row created for storing the rank by quantity_sold.

The output rows of Window Rank QuantitySold 115 are supplied as input rows to Window Rank AmountSold 110. Window Rank AmountSold 110 implements the window ranking function rank( ) over (partition by prod_id, channel_id order by (amount_sold) specified in Q1. Window Rank AmountSold 110 ranks, within each partition defined by partition keys prod_id and channel_id, rows according to column amount_sold. The rank for each row may be inserted in a column of each row created for storing the rank by amount_sold.

Execution plan 101 is an example of an execution plan that may be executed by a single database process. The database process first executes Table Scan 120. Once completing Table Scan 120, the database process next executes Window Rank QuantitySold 115. Once, completing Window Rank QuantitySold 115, the database process next executes Window Rank AmountSold 110.

Ranking by Sorting on Partition and Ranking Columns

Each of Window Rank QuantitySold 115 and Window Rank AmountSold 110 generates a rank by independently performing a sort-based ranking, which entails performing a sort operation. Importantly, the sort keys for the sort operation not only include the ranking column but also the partitioning keys.

As depicted in FIG. 1, the sort keys of sort operations for Window Rank QuantitySold 115 and Window Rank AmountSold 110, as depicted in sort order, are (prod_id, channel_id, quantity_sold) and (prod_id, channel_id, amount_sold), respectively.

FIG. 2 depicts scanned rows from table sales used to illustrate a sort-based ranking. Scanned rows 201 include column prod_id, channel_id, cust_id, amount_sold, quantity_sold, and rank_q and rank_a. Column rank_q and column rank_a are not from table sales but have been added to store the rank generated by Window Rank QuantitySold 115 and Window Rank AmountSold 110, respectively. Scanned rows 201 may include other columns not depicted in FIG. 2.

FIG. 2 depicts column values for each of scanned rows 201. For example, for the first row of scanned rows 201, the column values of prod_id, channel_id, cust_id, amount_sold, quantity_sold, and rank_q are P1, Ch1, Cust1, 800.00, 10, 1, respectively.

Scanned rows 201 are shown after having been sorted by prod_id, channel_id, quantity_sold. Because the rows have been sorted by the partition keys prod_id, channel_id, scanned rows 201 are also grouped by partition. Partition P1C1 includes rows with partition key values P1 and Ch1, P1C2 includes rows with partition key values P1 and Ch2, and P2C2 includes rows with partition key values P2 and Ch1. Within each of these partitions, the rows are ordered by quantity_sold.

Once sorted in this way, scanned rows 201 are scanned in order and a rank is determined for each in a partition-wise fashion. Referring to FIG. 2. the first two rows in the partition P1C1 are scanned and assigned rank value 1. The following row is scanned and assigned rank 3. The next row is in the next partition P1C2, so the ranking value in effect resets. Accordingly, the next row is assigned ranking value 1, and the next after that ranking value 2, and so forth.

After Window Rank QuantitySold 115 ranks scanned rows 201, the rows become the input for Window Rank AmountSold 110. The sort-based operation is performed on the entirety of scanned rows 201 again, except that the sort keys used include amount_sold instead of quantity_sold.

Described herein are approaches for executing single-query analytic operations on the same set of rows that avoid repeating the same kind of operation for each analytic operation. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details.

General Overview

Described herein are techniques for forming execution plans for single-query analytic operations more efficiently. The execution plans incorporate two new novel plan operators, a partition creator and partition iterator. The partition creator and partition iterator operate as a pair. A partition creator operator creates partitions of rows and a partitioning descriptor describing the partitions created. A partition iterator iterates through the partitions based on the partitioning descriptor. For each partition, multiple analytic operators are executed serially, one after the other, on the same rows in the partition. According to an embodiment, partitioning is based on one or more common partition keys to form partitions against which multiple analytic functions or operators are executed. The one or more common partition keys may be ignored when executing each of the multiple analytic operators against the common partitions, as illustrated below. Forming execution plans that include a pair of partition creator and partition iterator operators in this way is referred to herein as partitioning injection.

Serial Query Execution

Figure 1:
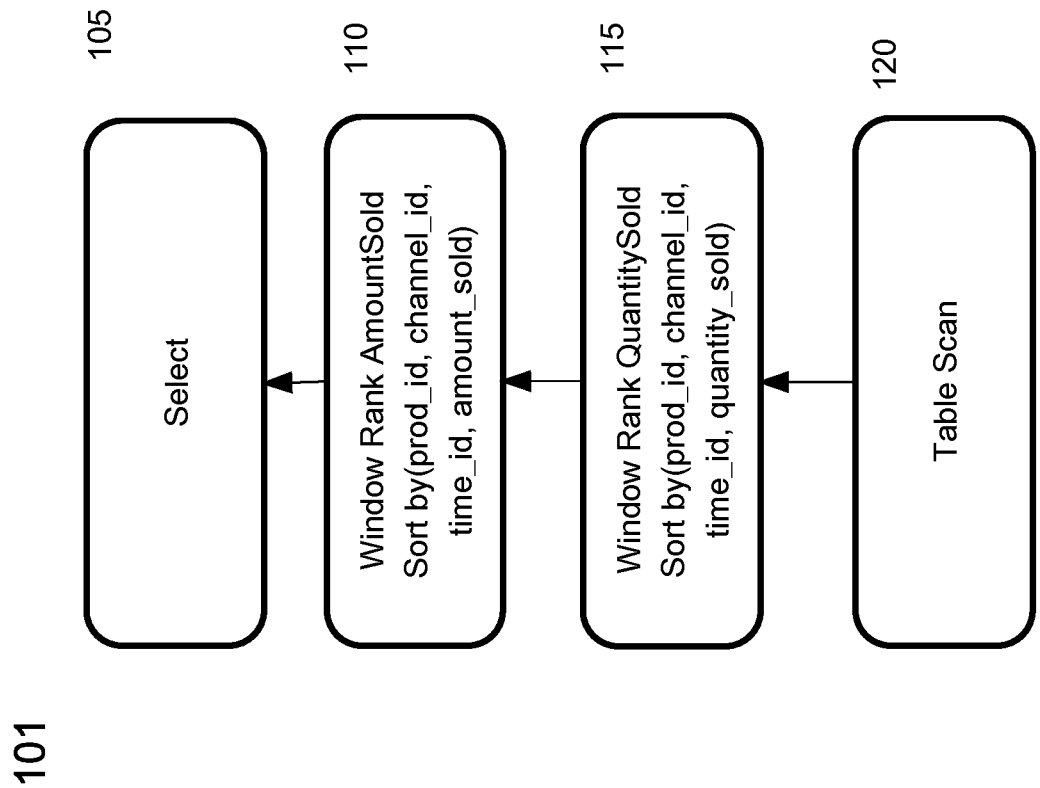
FIG. 1 depicts an execution plan for executing a query that includes window functions, according to an embodiment of the present invention.
Figure 2:
FIG. 2 depicts rows from a table that are partitioned when computing window functions, according to an embodiment of the present invention.
Figure 3:
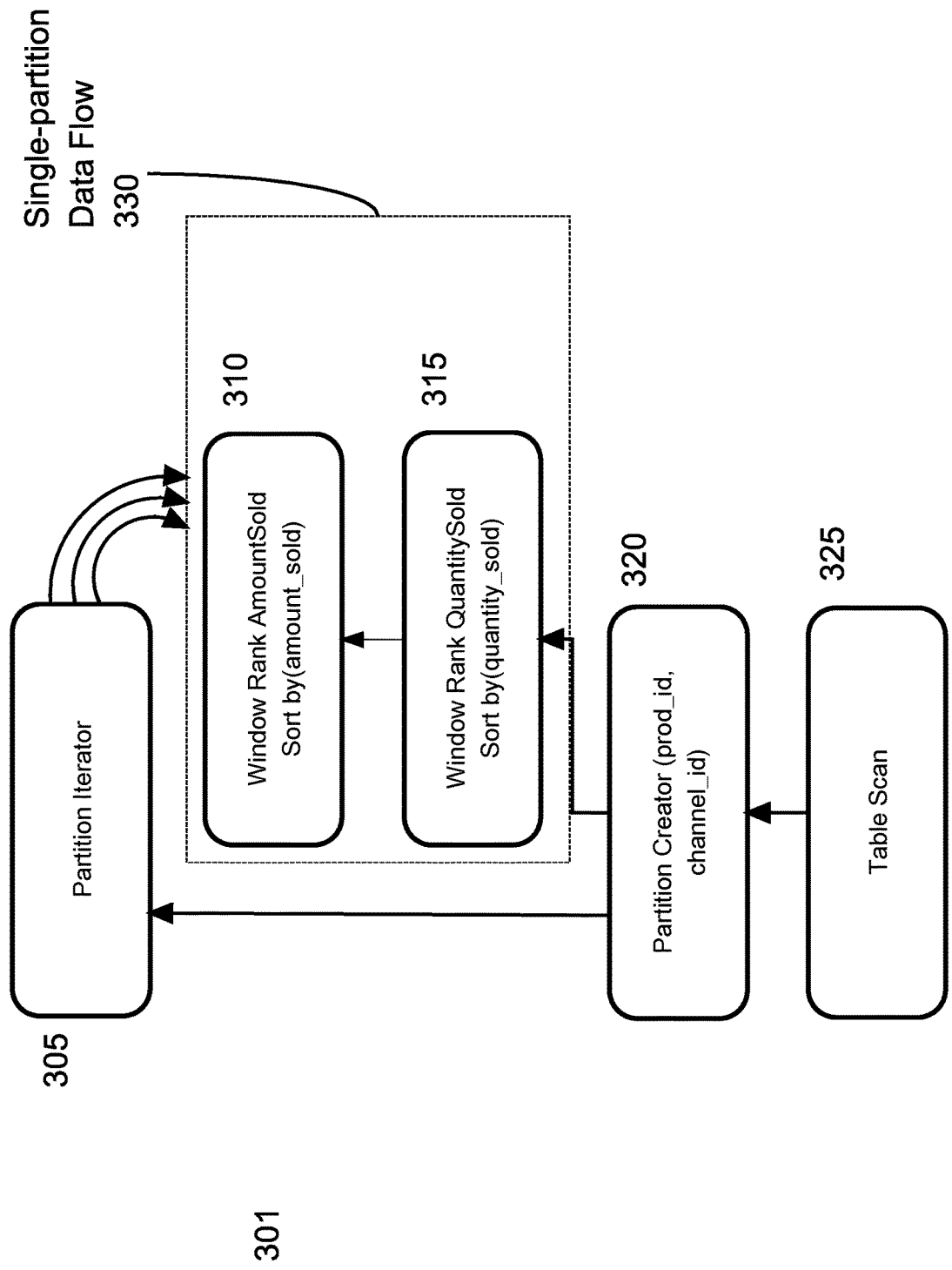
FIG. 3 depicts an execution plan formed using partitioning injection, according to an embodiment of the present invention.

FIG. 3 shows an execution plan 301 generated using partitioning injection. Execution plan 301 is generated for executing query Q1 according to an embodiment of the present invention. FIG. 3 is a view of execution plan 301 that does not depict all execution plan operators in execution plan 301, such as a projection operator similar to Select 105 for projecting rows generated by execution plan 301. In another embodiment, execution plan 301 may be a subplan that is a part of the larger execution plan for executing a query. For example, execution plan 301 may be a subplan for a subquery. According to an embodiment, a database process serially executes execution plan 301.

Execution plan 301 includes plan operators Table Scan 325, Partition Creator 320, Partition Iterator 305, Window Rank AmountSold 310 and Window Rank QuantitySold 315.

Partition Creator 320 partitions rows from Table Scan 325 into partitions of rows (not shown). The rows are partitioned by partition keys prod_id and channel_id.

Window Rank AmountSold 310 and Window Rank QuantitySold 315 comprise a Single-Partition Data Flow 330. That is, Window Rank AmountSold 310 and Window Rank QuantitySold 315 operate together on partitions generated by Partition Creator 320, one partition at a time; each partition is input to Window Rank QuantitySold 315, the output of which is the partition as transformed by Window Rank QuantitySold 315. This output is input to Window Rank AmountSold 310, the output of which is the partition as further transformed by Window Rank AmountSold 310.

Partition Iterator 305 iterates over each partition. For each partition, Partition Iterator 305 causes single-partition data flow to operate on the partition.

Similar to Window Rank AmountSold 110 and Window Rank QuantitySold 115 in execution plan 101, Window Rank AmountSold 310 and Window Rank QuantitySold 315 rank rows by performing sort-based ranking on their respective input rows. However, rather than sorting on the partition keys and the ranking key, Window Rank AmountSold 310 and Window Rank QuantitySold 315 ignore the partition keys. That is, Window Rank AmountSold 310 performs a sort-based ranking using ranking key amount_sold as a sort key but not using partition keys prod_id and channel_id as sort keys for the sort-based ranking. Similarly, Window Rank AmountSold 310 performs a sort-based ranking using ranking key quantity_sold but not partition keys prod_id and channel_id.

Execution of execution plan 301 is illustrated with reference to scanned rows 201. Partition Creator 320 creates partitions P1C1, P1C2, and P2C1. Partition Iterator 305 causes Single-Partition Data Flow 330 to iteratively operate on each of the partitions, one at a time.

In the first iteration, Single-Partition Data Flow 330 uses as input the partition P1C1. Window Rank QuantitySold 315 performs a sort-based ranking on partition P1C1. The partition P1C1, once ranked and sorted according to ranking key quantity_sold becomes the output of Window Rank QuantitySold 315 and the input for Window Rank AmountSold 310, and once ranked and sorted according to ranking key amount_sold, becomes the output of Window Rank AmountSold 310.

In subsequent iterations, Single-Partition Data Flow 330 operate on partition P1C2 and P2C1 in a similar fashion as with partition P1C1.

As mentioned before, a single database process may execute execution plan 301. The database process executes Table Scan 325 and Partition Creator 320 on ranges of data blocks that hold rows for table sales. As ranges of data blocks are read, the rows therein are partitioned according to prod_id and channel_id and stored in partitioning buffers. There is a set of buffers for each partition. Due to memory (e.g. volatile RAM) constraints, the buffers may spill over to (i.e. stored to) higher latency block-based persistent storage (e.g. flash, disk). As Partition Creator 320 is executed, the various partitions are tracked by updating a partitioning descriptor to identify the partitions generated. The partition descriptor may be stored in memory.

After the partitions are created, the database process then executes Partition Iterator 305, and Window Rank QuantitySold 315 and Window Rank AmountSold 310 iteratively in serial fashion in each iteration. The database process reads the partition descriptor to select an unprocessed partition. The database process then executes Window Rank QuantitySold 315 on all the rows in the selected partition and then executes Window Rank AmountSold 310 on all the rows in the partition.

Executing Window Rank QuantitySold 315 and Window Rank AmountSold 310 may entail reading the partition buffers for a partition from block-based persistent storage into memory. Because only one partition worth of partition buffers are processed in an iteration, the necessity of having to swap out partition buffers between block-based persistent storage and memory while performing analytical operations is reduced or eliminated, enabling the analytic operations to be performed more quickly and efficiently.

In addition, the partition keys by which the partitions are formed may be ignored when performing analytic operations on the partition. Because the partition keys (i.e. prod_id, channel_id) of the partitions within which rows are ranked by quantity_sold or amount_sold, the partition keys are ignored when computing a ranking for each partition using sort-based ranking. Within each partition, the rows only need to be sorted by either quantity_sold or amount_sold; the columns prod_id and channel_id are ignored when sorting.

Sorting on less sorting keys may be more efficient than sorting on more sorting keys. Specifically, sorting on less sorting keys may be less computationally expensive, requires less computer cycles, and smaller data structures that require less memory to store.

Parallel Query Execution Plans with Partitioning Injection

Figure 4:
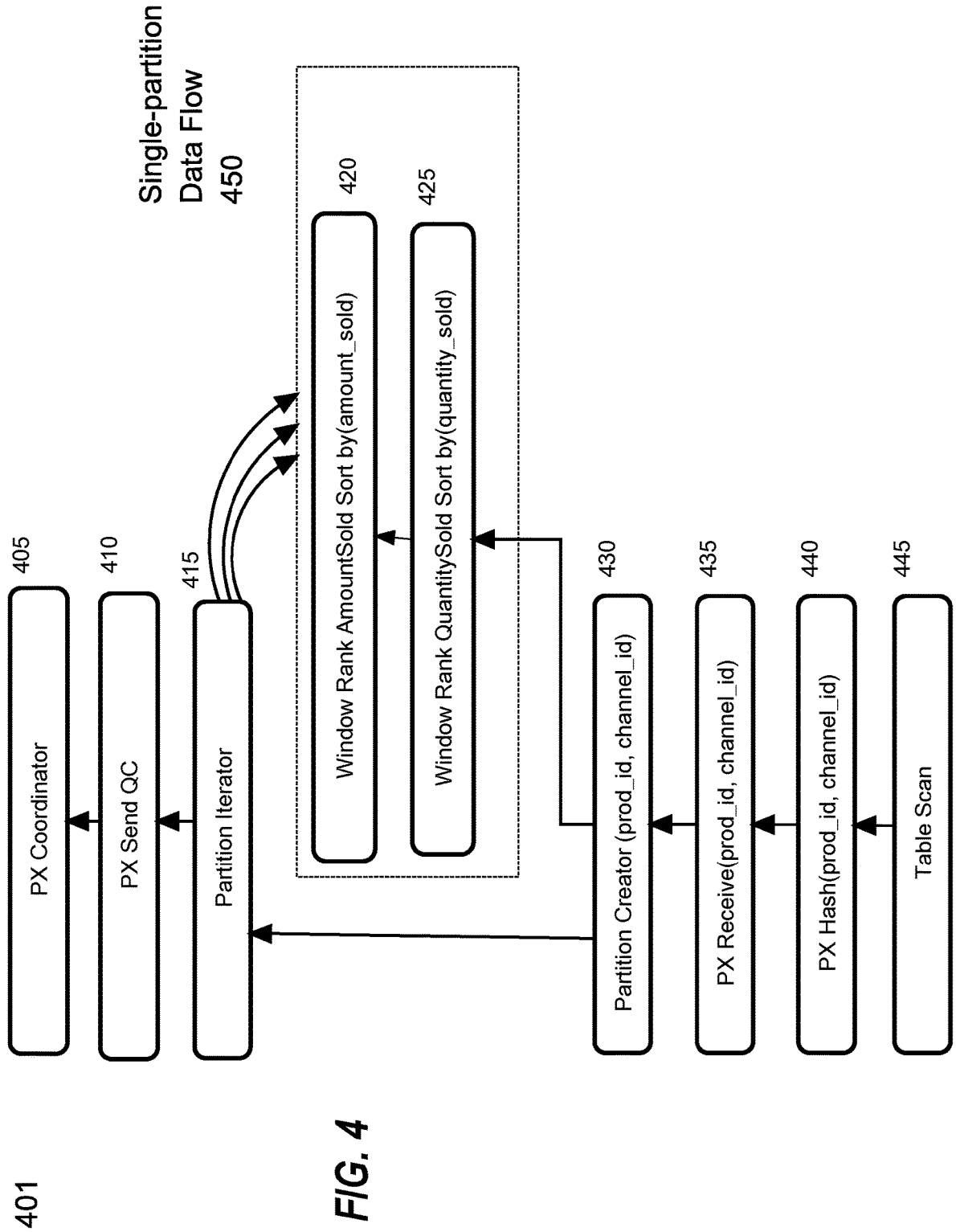
FIG. 4 depicts an execution plan formed using partitioning injection for parallel execution, according to an embodiment of the present invention.

FIG. 4 shows an execution plan 401, an execution plan formed with partitioning injection for executing query Q1 in parallel by slave processes. Execution plan 401 includes plan operators Table Scan 445, PX Hash Distribute 440, PX Receive 435, Partition Creator 430, Partition Iterator 415, Window Rank AmountSold 420 and Window Rank QuantitySold 425, which comprise Single-Partition Data Flow 450, PX Coordinator 405, and PX Send QC 410. FIG. 4 is a view of execution plan 401 that does not show all plan operators in execution plan 301, such as a projection operator projecting rows generated by execution plan 401.

Because execution plan 401 is a plan for parallel execution, a description of parallel execution is useful. Parallel query execution entails that execution of a query plan by multiple database processes. According to an embodiment, the database processes include a query coordinator and multiple slave processes. One or more plan operators of an execution plan are divided into subtasks referred to herein as work granules. A work granule may be assigned by the query coordinator to a slave process. When a slave process completes a work granule, the query coordinator may assign another work granule to the slave process.

In the context of execution plan 401, Table Scan 445 is divided into work granules such that each is for processing a separate range of data blocks storing rows of the table. Each work granule is assigned by the query coordinator to a slave process. Multiple slave processes may be working concurrently on different work granules. The slave process executing a work granule executes Table Scan 445 to scan rows for the respective range of data blocks and executes PX Hash Distribute 440 to distribute the rows to other slave processes based on a hashing function to another slave process.

PX Hash Distribute 440 distributes the rows to the other slave processes based on hashing keys prod_id and channel_id and a hashing distribution function. The hashing distribution function in effect maps each unique combination of prod_id and channel_id values to a work granule that has been assigned to particular slave process from another set of slave processes. The slave processes in the other set are referred to herein as a receiver slave process herein with respect to slave processes executing PX Hash Distribute 440.

Each of the work granules assigned to the receiver slave processes entails executing the PX Receive 435 and Partition Creator 430. Each receiver slave process receives rows distributed to it by PX Hash Distribute 440 and partitions the rows by prod_id and channel_id into partitions, each partition being for a unique combination of prod_id and channel_id values.

Because the hashing distribution maps each unique combination of prod_id and channel_id values to single work granule, one consumer slave process receives all rows distributed that have a particular combination of prod_id and channel_id values. As a consequence, any partition created by Partition Creator 430 is created by one receiver slave process. Each receiver slave process generates in shared memory a partitioning descriptor of the partitions created by the receiver slave process.

After the distributed rows have been partitioned by the receiver slave processes, the slave processes of another set of slave processes are assigned work granules that each entail performing Partition Iterator 415, Window Rank QuantitySold 425 and Window Rank AmountSold 420 as Single-Partition Data Flow 450. Each of these slave processes executes Partition Iterator 415, and Window Rank QuantitySold 425 and Window Rank AmountSold 420 iteratively in serial fashion within each iteration. The slave process reads the partition descriptor in shared memory generated for the partitions being processed by the slave process in order to select an unprocessed partition. The slave process then executes Window Rank QuantitySold 425 on all the rows in the selected partition and then executes Window Rank AmountSold 420 on all the rows in the partition.

Nested Query Plan

A query may specify multiple analytical operations across different partitions that share a common partition key. The Query Q2 is an example of a such a query.

```
select
    prod_id, channel_id, cust_id,
    rank( ) over (partition by prod_id, channel_id order by
    amount_sold)
    rank( ) over (partition by prod_id, channel_id order by
    quantity_sold)
    rank( ) over (partition by prod_id, cust_id order by amount_sold)
    rank( ) over (partition by prod_id, cust_id order by quantity_sold)
from sales;
```

Q2 specifies the window ranking functions:

(1) rank( ) over (partition by prod_id, channel_id order by amount_sold)

(2) rank( ) over (partition by prod_id, channel_id order by quantity_sold)

(3) rank( ) over (partition by prod_id, cust_id order by amount_sold)

(4) rank( ) over (partition by prod_id, cust_id order by quantity_sold)

The first pair of window ranking functions is the same as the ranking functions of query Q1. As mentioned before, partitioning keys for these window ranking functions are (prod_id, channel_id). However, the partition keys for the second pair of window ranking functions are different. The partitioning keys for the second window ranking function are (prod_id, cust_id). The common partition key between the two pairs of is (prod_id).

The window ranking functions may be computed by partitioning rows twice. First, the rows are partitioned by (prod_id, channel_id) and the first two window ranking functions are computed. Next, the rows are partitioned by (prod_id, cust_id) and the second two window ranking functions are computed.

According to an embodiment, the partitioning and analytic operations are performed in nested fashion, with partitions formed by one or more common partition keys. For each partition formed one or more common partition keys, sets of subordinate "subpartitions" are formed, each set being generated serially. After generating a set of subpartitions, the analytic operations that may be computed using the set are computed. Then another set of subpartitions may be generated, and analytic operations performed on that set.

For example, partitions are formed by partitioning by prod_id. For a partition for prod_id value P1, a first set of subordinate subpartitions is formed, one subordinate partition for each channel_id value in the rows of the partition. For each of the subpartitions in the first set, the first two window ranking functions in query Q2 are computed. Next, the first set of subpartitions is repartitioned to form a second set of subpartitions, one subpartition for each cust_id value in the rows of the partition. For each subordinate partition in the second set, the second pair of window ranking functions (3) and (4) in query Q2 are computed.

Figure 5:
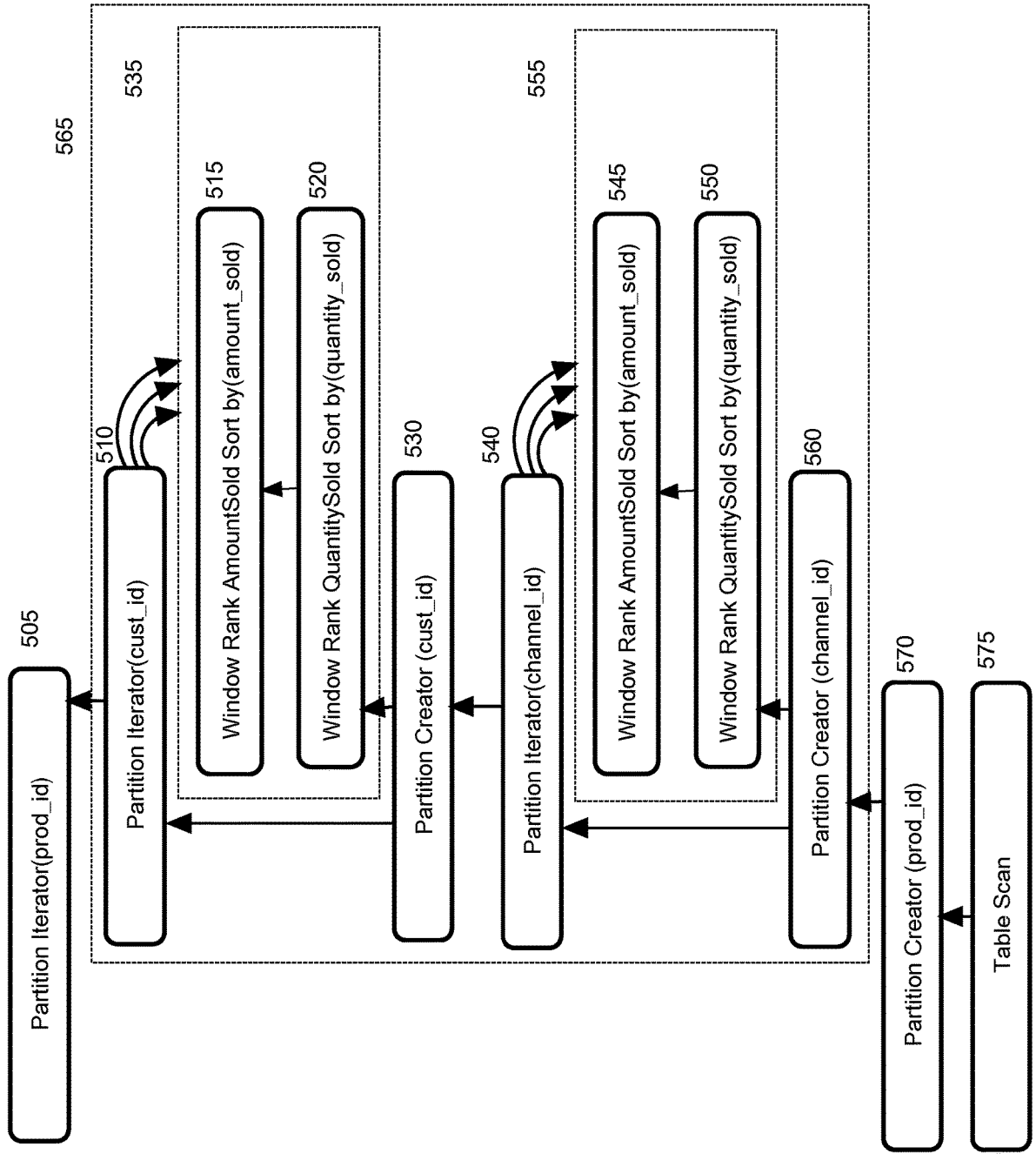
FIG. 5 depicts an execution plan formed using nested partitioning injection, according to an embodiment of the present invention.

FIG. 5 shows an execution plan 501 for executing query Q2 by partitioning and computing analytical functions in a nested fashion. To execute query Q2 in this manner, execution plan 501 includes nested pairs of partition creator and partition iterator operators. FIG. 5 is a view of execution plan 501 that does not show all plan operators in execution plan 501.

Referring to the FIG. 5, execution plan 501 comprises table scan 575, the output of which is the input of Partition Creator(prod_id) 570. Partition Creator(prod_id) 570 creates partitions rows partitioned by partition key prod_id. Partition Iterator(prod-id) 505 iterates through each partition, causing Single-Partition Data Flow 565 to operate on each partition.

Single-Partition Data Flow 565 comprises two pairs of partition creation and partition iterator operators. The first pair comprises Partition Creator (channel_id) 560 and Partition Iterator(channel_id) 540 and the second pair comprises Partition Creator (channel_id) 560 and Partition Iterator(channel_id) 540. For each partition generated by Partition Creator(prod_id) 570:

A. Partition Creator (channel_id) 560 partitions the partition generated by Partition Creator(prod_id) 570 into subordinate partitions partitioned by channel_id. Partition Iterator(channel_id) 540 iterates through each subordinate partition, causing execution of a Single-Partition Data Flow 555. Single-Partition Data Flow 555 includes Window Rank QuantitySold 550 and Window Rank AmountSold 545. Single-Partition Data Flow 555 operates on each subordinate partition in a manner similar to described for Single-Partition Data Flow 330.

B. The subpartitions generated by Partition Creator (channel_id) 560 are input to Partition Creator (channel_id) 530. Partition Creator (channel_id) 530 repartitions these subpartitions into another set of subordinate partitions partitioned by cust_id. The Partition Iterator(cust_id) 510 iterates through each subordinate partition, causing execution of a Single-Partition Data Flow 535. Single-Partition Data Flow 535 includes Window Rank QuantitySold 515 and Window Rank AmountSold 520. Single-Partition Data Flow 535 operates on each subordinate partition in a manner similar to described for Single-Partition Data Flow 330.

Partition Injection for Partial Partitioning

Partition injection has been illustrated so far by creating partitions and subpartitions that fully partition rows, thereby forming groups of rows against which the computation of analytic function values within each partition or subpartition may ignore any partition keys. For example, in execution plan 501, execution of Window Rank QuantitySold 515 and Window Rank AmountSold 520 operate on subpartitions such that only the measure keys quantity_sold and amount_sold need to be sorted; the partition keys are ignored when sorting.

In an embodiment, partition injection may generate partition or subpartitions that are not fully partitioned by the partitioning columns. Partitioning for not fully partitioned partitions or subpartitions is illustrated by query Q3 below.

```
                                Q3
select
    prod_id, channel_id, cust_id
    sum(amount_sold) over (partition by prod_id, channel_id order
    by time_id) cum_sum1
    sum(quantity_sold) over (partition by prod_id, channel_id order
    by time_id) cum_sum2
from sales;
```

Q3 specifies the window cumulative sum functions:

(1) sum(amount_sold) over (partition by prod_id, channel_id order by time_id)

(2) sum(quantity_sold) over (partition by prod_id, channel_id order by time_id)

The first window cumulative sum function specifies to order rows by column time_id within partitions partitioned by prod_id and channel_id, and for each row in each partition, generate a cumulative sum quantity_sold that is the summation of the amount_sold of the row and of the rows preceding the row in the partition based on the order. The second window cumulative sum function specifies to sum quantity_sold in the same manner.

A window cumulative sum function may be computed using a sort-based cumulative summation, where rows are ordered within a partition. In the case of query Q3, within each partition, the rows are visited in order, a sum quantity_sold or amount_sold is accumulated and added to a column in the row that holds cumulative sum.

Figure 6:
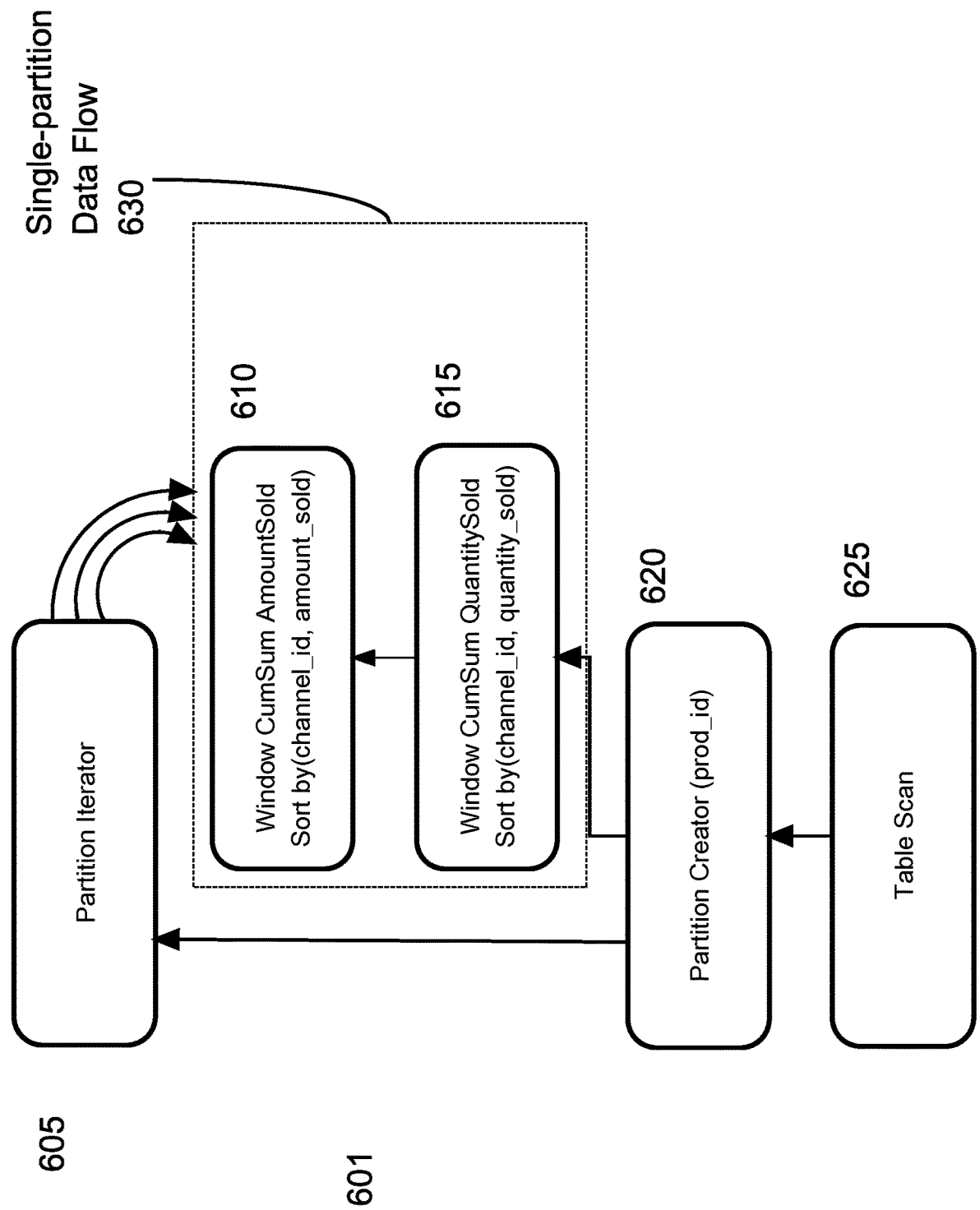
FIG. 6 depicts an execution plan formed using partitioning injection for partitions partitioned by a subgrouping of a grouping, according to an embodiment of the present invention.

The above window cumulative sum function aggregates by partition keys (prod_id, channel_id). According to an embodiment of the present invention, partition injection may be used to form partitions partition only on a common partition key (prod_id). The partitions against which window cumulative sum function of Q3 are not fully partitioned by all the partitioning keys of the window cumulative sum functions. FIG. 6 depicts an execution plan 601 which computes analytic functions against partitions not fully partitioned by the partitioning keys.

Referring to FIG. 6, execution plan 601 is an execution plan for executing query Q3, according to an embodiment of the present invention. Execution plan 601 includes plan operators Table Scan 625, Partition Creator 620, Partition Iterator 605, Window CumSum QuantitySold 615 and Window CumSum AmountSold 610. FIG. 6 is a view of execution plan 601 that does not include all plan operators in execution plan 601.

Partition Creator 320 partitions rows from Table Scan 625 into partitions of rows (not shown). The rows are partitioned by partition key (prod_id).

Window CumSum QuantitySold 615 and Window CumSum AmountSold 610 comprise a Single-Partition Data Flow 630. Partition Iterator 605 iterates over each partition. For each partition, Partition Iterator 605 causes Single-Partition Data Flow 630 to operate on the partition. Window Cum AmountSold 610 and Window Cum QuantitySold 615 perform sort-based cumulative summation on their respective input rows. However, rather than sorting on only the order-by key time_id, Window Rank AmountSold 310 and Window Rank QuantitySold 315 sort by partitioning key channel_id and order-by key time_id.

Database Systems

A DBMS manages a database and may comprise one or more database servers. A database comprises database data and a database dictionary that are stored on a persistent memory mechanism, such as block-based persistent storage. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session process may generate an execution plan for a query issued by the database session client and may, acting as a query coordinator, marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes are computer system processes that run under the control of the database server (i.e., can be created or terminated by the database server) and perform various database server functions. Database processes include processes running within a database session established for a client, including slave processes executing an execution plan.

For purposes of exposition, execution plan operators may be described herein is performing an action or operation. However, this is a convenient way of expressing that a database process has, is or will execute the execution plan operation corresponding to the execution plan. In addition, a database process may be described herein as executing an execution plan operator. However, this is a convenient way of expressing that a database process has, is or will execute the execution plan operation corresponding to the execution plan.

Database processes also include "database server system" processes which provide services and/or perform functions on behalf of the entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedures arguments, and the return data type and the data types of the arguments, and may include source code and a compiled version thereof.

A database object may be defined by the database dictionary, but the metadata in the database dictionary itself may only partly specify the properties of the database object. Other properties may be defined by data structures not considered part of the database dictionary. For example, a user defined function implemented in a JAVA class may be defined in part by the database dictionary by specifying the name of the user defined function and by specifying a reference to a file containing the source code of the Java class (i.e. .java file) and the compiled version of the class (i.e. .class file).

Memory Overview

Because embodiments of the invention involve a novel use of a non-volatile RAM, a description of memory is pertinent and useful. As used herein, "non-volatile" refers to a characteristic of a memory that retains data in the absence of any form of electrical power, including external or battery backup. Examples of non-volatile memory include e-prom memory, flash memory, and disk memory. Non-volatile memory does not include volatile memory for which power is retained by a battery backup in the absence of another external power source. For example, volatile memory coupled to a board with an embedded battery-backup is not non-volatile memory, because without the power provided by a battery, the volatile memory does not retain data.

Byte-addressable memory is distinguishable from block-addressable memory. A byte is eight bits and is the minimum amount of data that may be addressed, retrieved from memory, or written to in byte-addressable memory. Thus, to manipulate a bit in a byte, a byte containing the bit must be fetched to a register of processor executing a machine instruction that references the byte (or word containing the byte) and manipulated according to the machine instruction or another machine instruction.

In contrast, the minimum size for a unit of block-addressable memory is a data block. A data block comprises multiple bytes and multiple words and cannot be entirely stored within a register of a processor. For block-addressable memory, a data block is the minimum amount of data that may be addressed, retrieved from memory, or written to memory. Examples of block-addressable memory include flash memory and disk memory. To manipulate a bit or a byte in a block, a block containing those bits is loaded into a byte-addressable memory by an instruction referencing the block issued to a block-based interface. Bock-addressable memory may be referred to herein as block-based persistent storage.

RAM is distinguishable from read-only memory (ROM) in that data in RAM can be overwritten. As used herein, overwriting data refers to replacing the data with new data without first having to erase the data in the memory. Thus, as used herein, RAM refers to byte-addressable memory that can be overwritten.

Database Data Blocks

A data block is used by a DBMS to store one or row more database rows, or portions of rows, including one or more columns of a row. When rows are read from persistent storage, a data block containing the row is copied into a database data block buffer in RAM and/or main memory of a database server. A data block that is used to store database data maybe referred to herein as a database block. A database block usually contains multiple rows, and database block metadata describing the contents of the database block. Metadata includes control and formatting information, such as offsets to sequences of bytes representing rows or other data structures, and a list of transactions affecting a row.

A database block is referred to as being atomic because, at least in part, a database block is the smallest unit of database data a database server may request from a persistent storage device. For example, when a database server seeks a row that is stored in a data block, the data block may only read the row from a persistent storage device by reading in the entire data block.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
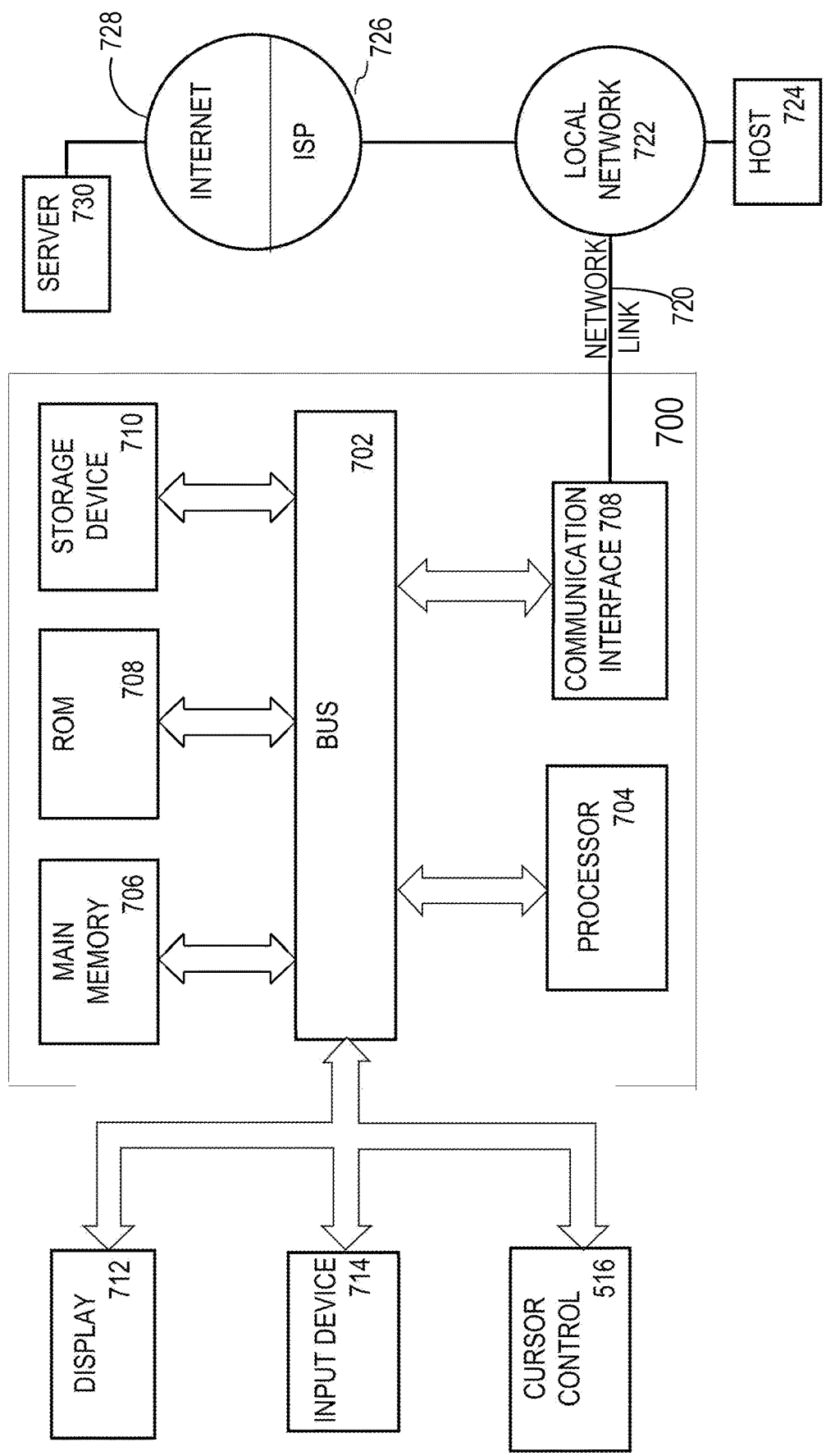
FIG. 7 is a diagram depicting a computer system that may be used to implement an embodiment of the present invention.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 8:
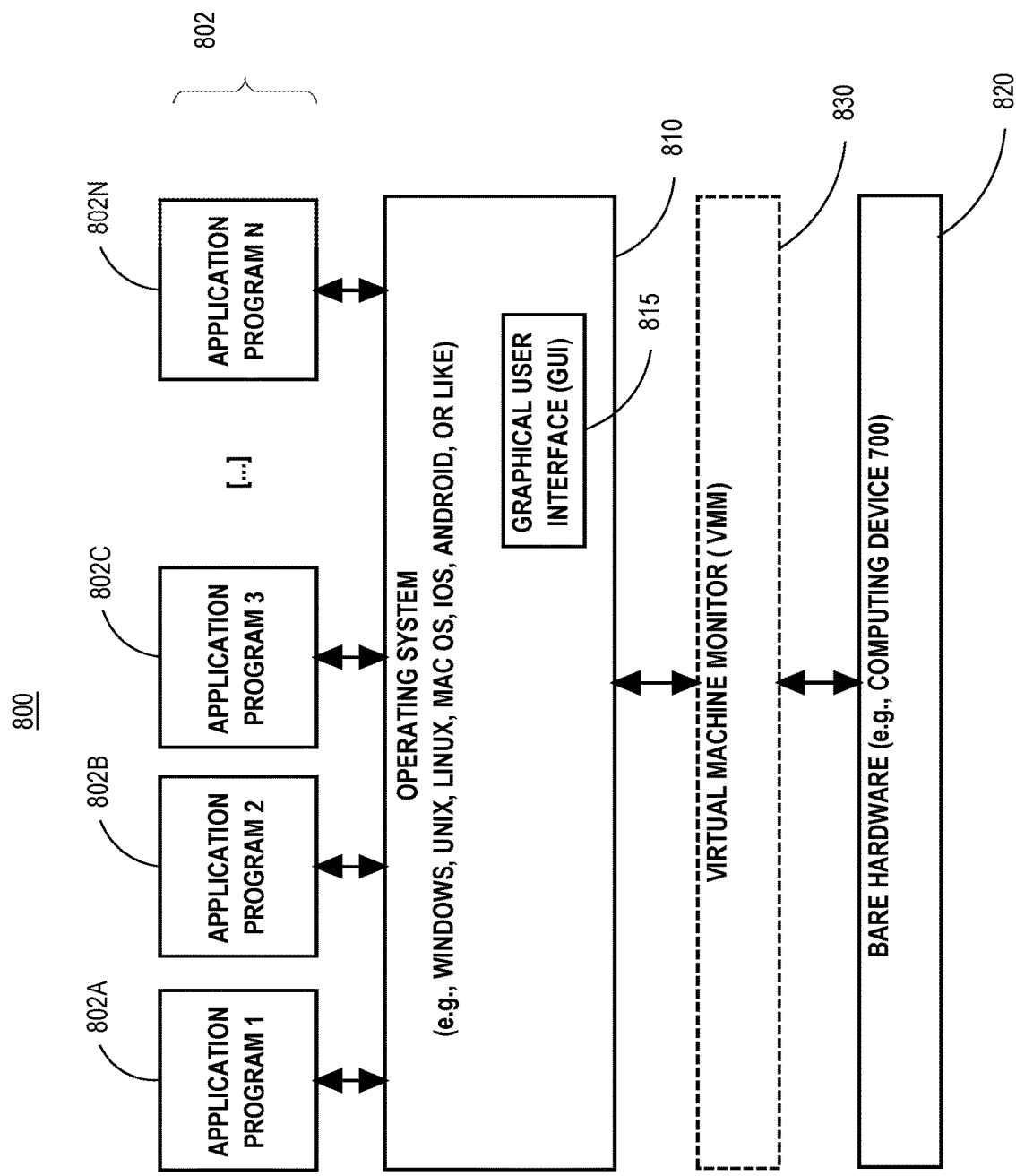
FIG. 8 depicts a software system that may be employed for controlling the operation of a computer system according to an embodiment of the present invention.

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

What is claimed is:

1. A method, comprising:
generating an execution plan for a query that specifies a plurality of analytic functions, wherein a first set of analytic functions of said plurality of analytic functions partitions rows according to a first plurality of partition keys, wherein said execution plan comprises a plurality of operators, wherein said plurality of operators include:
   a first partition creator operator that specifies to create a first plurality of first partitions based on one or more first partition keys, each first partition key of said one or more first partition keys belonging to said first plurality of partitioning keys;
   a first partition iterator operator that specifies to iterate through said first plurality of first partitions and specifies for each iteration through said first plurality of first partitions:
      a first analytic operator that specifies to perform a first analytic function on a respective first partition of said each iteration through said first plurality of first partitions in a way that ignores said one or more first partition keys;
      a second analytic operator that specifies to perform a second analytic function on said respective first partition of said each iteration through said first plurality of first partitions in a way that ignores said one or more first partition keys;
      wherein said first analytic function and said second analytic function belong to the first set of analytic functions;
executing the execution plan, wherein executing the execution plan includes:
   generating said first plurality of first partitions;
   for each first partition of said first plurality of first partitions:
      ignoring said one or more first partition keys, computing the first analytic function for one or more rows in said each first partition; and
      ignoring said one or more first partition keys, computing the second analytic function for one or more rows in said each first partition.

2. The method of claim 1, wherein a second set of analytic functions of said plurality of analytic functions aggregates rows according to a second plurality of partition keys, wherein said plurality of operators include:
   a second partition creator operator that specifies to create a second plurality of second partitions based on one or more second partition keys, each second partition key of said one or more second partition keys belonging to said second plurality of partition keys; and
   a second partition iterator operator that specifies to iterate through said second plurality of second partitions and specifies for each iteration through said second plurality of second partitions:
      a third analytic operator that specifies to perform a third analytic function on a respective second partition of said each iteration through said second plurality of second partitions in a way that ignores said one or more second partition keys;
      a fourth analytic operator that specifies to perform a fourth analytic function on said respective second partition of said each iteration through said second plurality of second partitions in a way that ignores said one or more second partition keys; and
      wherein said third analytic function and said fourth analytic function belong to the second set of analytic functions.

3. The method of claim 1,
wherein said plurality of operators include:
   a third partition creator operator that specifies to create a third plurality of third partitions based on one or more third partition keys, each third partition key of said one or more third partition keys belonging to said first plurality of partition keys;
   a third partition iterator operator that specifies to iterate through said third plurality of third partitions and specifies for each iteration through said third plurality of third partitions:
      said first partition creator operator to create said first plurality of first partitions from a respective third partition of said third plurality of third partitions.

4. The method of claim 1, wherein:
for each first partition of said first plurality of first partitions:
   computing the first analytic function for one or more rows in said each first partition includes sorting rows in said each first partition based on a sort key not included in said one or more first partition keys;
   computing the second analytic function for one or more rows in said each first partition includes sorting rows in said each first partition based on a sort key not included in said one or more first partition keys.

5. The method of claim 4, wherein computing the second analytic function includes commencing computing the second analytic function after completing computing the first analytic function.

6. The method of claim 1, wherein:
for each first partition of said first plurality of first partitions:
   computing the first analytic function for one or more rows in said each first partition includes sorting rows in said each first partition based on a sort key that is a measure column;
   computing the second analytic function for one or more rows in said each first partition includes sorting rows in said each first partition based on a sort key that is a measure column.

7. The method of claim 1, wherein the one or more first partition keys do not include a first partition key from said first plurality of partition keys.

8. The method of claim 1, wherein:
said first plurality of first partitions includes a first subset of first partitions and a second subset of second partitions; and
for each particular first partition of said first subset of first partitions:
   computing the first analytic function for one or more rows in said each particular first partition includes a first slave process computing the first analytic function, and
   computing the second analytic function for one or more rows in said each particular first partition includes said first slave process computing the first analytic function; and
for each particular second partition of said second subset of second partitions:
   computing the first analytic function for one or more rows in said each particular second partition includes a second slave process computing the first analytic function, and computing the second analytic function for one or more rows in said particular first partition includes said first slave process computing the first analytic function.

9. The method of claim 1, wherein said first analytic function and said second first analytic function are window ranking functions.

10. The method of claim 1, wherein said first analytic function and said second first analytic function are window cumulative summation functions.

11. One or more non-transitory storage media storing one or more sequences of instructions, which when executed by one or more processors, cause:
generating an execution plan for a query that specifies a plurality of analytic functions, wherein a first set of analytic functions of said plurality of analytic functions partitions rows according to a first plurality of partition keys, wherein said execution plan comprises a plurality of operators, wherein said plurality of operators include:
a first partition creator operator that specifies to create a first plurality of first partitions based on one or more first partition keys, each first partition key of said one or more first partition keys belong to said first plurality of partitioning keys;
a first partition iterator operator that specifies to iterate through said first plurality of first partitions and specifies for each iteration through said first plurality of first partitions:
a first analytic operator that specifies to perform a first analytic function on a respective first partition of said each iteration through said first plurality of first partitions in a way that ignores said one or more first partition keys;
a second analytic operator that specifies to perform a second analytic function on said respective first partition of said each iteration through said first plurality of first partitions in a way that ignores said one or more first partition keys;
wherein said first analytic function and said second analytic function belong to the first set of analytic functions;
executing the execution plan, wherein executing the execution plan includes:
generating said first plurality of first partitions;
for each first partition of said first plurality of first partitions:
ignoring said one or more first partition keys, computing the first analytic function for one or more rows in said each first partition; and
ignoring said one or more first partition keys, computing the second analytic function for one or more rows in said each first partition.

12. The one or more non-transitory storage media of claim 11, wherein a second set of analytic functions of said plurality of analytic functions aggregates rows according to a second plurality of partition keys, wherein said plurality of operators include:
a second partition creator operator that specifies to create a second plurality of second partitions based on one or more second partition keys, each second partition key of said one or more second partition keys belonging to said second plurality of partition keys; and
a second partition iterator operator that specifies to iterate through said second plurality of second partitions and specifies for each iteration through said second plurality of second partitions:
a third analytic operator that specifies to perform a third analytic function on a respective second partition of said each iteration through said second plurality of second partitions in a way that ignores said one or more second partition keys;
a fourth analytic operator that specifies to perform a fourth analytic function on said respective second partition of said each iteration through said second plurality of second partitions in a way that ignores said one or more second partition keys; and
wherein said third analytic function and said fourth analytic function belong to the second set of analytic functions.

13. The one or more non-transitory storage media of claim 11,
wherein said plurality of operators include:
a third partition creator operator that specifies to create a third plurality of third partitions based on one or more third partition keys, each third partition key of said one or more third partition keys belonging to said first plurality of partition keys;
a third partition iterator operator that specifies to iterate through said third plurality of third partitions and specifies for each iteration through said third plurality of third partitions:
said first partition creator operator to create said first plurality of first partitions from a respective third partition of said third plurality of third partitions.

14. The one or more non-transitory storage media of claim 11, wherein the one or more sequences of instructions include instructions that, when executed by said one or more processors, cause:
for each first partition of said first plurality of first partitions:
computing the first analytic function for one or more rows in said each first partition includes sorting rows in said each first partition based on a sort key not included in said one or more first partition keys;
computing the second analytic function for one or more rows in said each first partition includes sorting rows in said each first partition based on a sort key not included in said one or more first partition keys.

15. The one or more non-transitory storage media of claim 14, wherein computing the second analytic function includes commencing computing the second analytic function after completing computing the first analytic function.

16. The one or more non-transitory storage media of claim 11, wherein the one or more sequences of instructions include instructions that, when executed by said one or more processors, cause:
for each first partition of said first plurality of first partitions:
computing the first analytic function for one or more rows in said each first partition includes sorting rows in said each first partition based on a sort key that is a measure column;
computing the second analytic function for one or more rows in said each first partition includes sorting rows in said each first partition based on a sort key that is a measure column.

17. The one or more non-transitory storage media of claim 11, wherein the one or more first partition keys do not include a first partition key from said first plurality of partition keys.

18. The one or more non-transitory storage media of claim 11,
- wherein said first plurality of first partitions includes a first subset of first partitions and a second subset of second partitions; and
- wherein the one or more sequences of instructions include instructions that, when executed by said one or more processors, cause:
- for each particular first partition of said first subset of first partitions:
  - computing the first analytic function for one or more rows in said each particular first partition includes a first slave process computing the first analytic function, and
  - computing the second analytic function for one or more rows in said each particular first partition includes said first slave process computing the first analytic function; and
- for each particular second partition of said second subset of second partitions:
  - computing the first analytic function for one or more rows in said each particular second partition includes a second slave process computing the first analytic function, and
  - computing the second analytic function for one or more rows in said each particular first partition includes said first slave process computing the first analytic function.

19. The one or more non-transitory storage media of claim 11, wherein said first analytic function and said second first analytic function are window ranking functions.

20. The one or more non-transitory storage media of claim 11, wherein said first analytic function and said second first analytic function are window cumulative summation functions.

* * * * *

UNITED STATES PATENT AND TRADEMARK OFFICE
CERTIFICATE OF CORRECTION

PATENT NO. : 11,301,468 B2
APPLICATION NO. : 16/571006
DATED : April 12, 2022
INVENTOR(S) : Bellamkonda It is certified that error appears in the above-identified patent and that said Letters Patent is hereby corrected as shown below:

In the Specification

In Column 1, Line 43, delete "(amount" and insert -- amount --, therefor.

In Column 1, Line 45, delete "(quantity" and insert -- quantity --, therefor.

In Column 2, Line 15, delete "(quantity" and insert -- quantity --, therefor.

In Column 2, Line 26, delete "(amount" and insert -- amount --, therefor.

In Column 8, Line 11, delete "Iterator(prod-id)" and insert -- Iterator(prod_id) --, therefor.

In the Claims

In Column 19, Line 6, in Claim 9, delete "second first" and insert -- second --, therefor.

In Column 19, Line 9, in Claim 10, delete "second first" and insert -- second --, therefor.

In Column 22, Line 12, in Claim 19, delete "second first" and insert -- second --, therefor.

In Column 22, Line 15, in Claim 20, delete "second first" and insert -- second --, therefor.

Signed and Sealed this
Sixteenth Day of August, 2022

Katherine Kelly Vidal
*Director of the United States Patent and Trademark Office*